Patented Aug. 29, 1944

2,357,016

UNITED STATES PATENT OFFICE 2,357,016

BINDING AGENTS FOR LINOLEUM, MASTIC TILE, ETC.

Abraham B. Miller, Newark, Del., assignor to Hercules Powder Company, Wilmington, Del., a corporation of Delaware No Drawing. Application June 25, 1941,
Serial No. 399,739

3 Claims. (Cl. 106—228)

This invention relates to resinous compositions adapted for use as binders for linoleum, mastic tile and similar floor and wall coverings.

In the manufacture of floor and wall coverings of the linoleum and mastic tile type, fibrous or non-fibrous fillers are bonded together with a binder usually composed of a resinous material admixed with toughening and plasticizing agents. Various types of binders have been employed. In linoleum compositions the binder is generally of a thermosetting character requiring heating to develop the maximum toughness of the toughening and plasticizing agent, which is generally an oxidized drying oil. In mastic tile compositions the binder is generally of a thermoplastic nature, the resinous material being blended with a toughening and plasticizing agent such as stearin pitch or heat-polymerized fast-drying oil, the mastic tile developing its final characteristics merely by cooling of the composition. The resinous material generally employed in production of binders for linoleum is rosin, whereas in mastic tile compositions cumar resins are most widely used.

The binders for linoleum have not possessed good resistance to alkali and moisture. As a result, the weak alkali contained in many soaps and cleansing powders has attacked the linoleum with a resulting breakdown of the wearing surface in a relatively short time. Also, such compositions are easily deformed under pressure and thus become permanently indented by chair or table legs. The use of cumar resins in mastic tile binders has served to improve alkali resistance but has not removed the deformation difficulties. However, use of the cumar resins adds considerably to the cost of the compositions.

It is an object of this invention to provide improved binding agents for floor and wall coverings of the linoleum or mastic tile type.

A further object is to provide binding agents for linoleum and mastic tile which provide materially improved alkali and moisture resistance and considerably reduced tendency to deformation under the pressure encountered in use.

Another object is to provide a binding agent for linoleum and mastic tile which is light in color and which retains its color on aging.

Another object is to provide improved floor covering materials of the type of linoleum and mastic tile.

Other objects of the invention will appear hereinafter.

The above objects are accomplished in accordance with this invention by utilizing a polymerized rosin or a high-melting polymerized rosin ester as the resinous component of a binding agent for linoleum, mastic tile and related covering compositions. By use of polymerized rosin or high-melting polymerized rosin esters it has been found that binders of much better alkali and water resistance are obtained and that the resulting linoleum and mastic tile are very resistant to washing and alkalies. Binders having a firmer body result and as a consequence the linoleum and mastic tile produced with use of the improved binders are not readily indented by pressure from chair legs, table legs, etc.

In producing the improved binding agents a polymerized rosin such as may be obtained by subjecting wood or gum rosin to a polymerization treatment with, for example, sulfuric acid, organic substituted sulfuric acids, phosphoric acid, tetraphosphoric acid, aluminum chloride, hydrofluoric acid, boron trifluoride, zinc chloride, etc., may be used. The polymerized rosin may be characterized broadly by possessing a melting point of from about 5° C. to about 100° C. above ordinary rosin, by a molecular weight from about 5% to about 400% above the molecular weight of ordinary rosin, and by a decreased iodine value. The polymerized rosins which will be preferred are those having a drop melting point of at least about 100° C. Esters of the polymerized rosin which may be used will be those having high-melting points and produced by esterification with polyhydric alcohols, as glycerol, pentaerythritol, mannitol, sorbitol, etc. Thus, esters melting above about 100° C. will be preferred.

In preparing the improved binders in accordance with the invention, other resinous components may be included with the polymerized rosin or rosin ester. However, in using other resins, such as rosin, it will be necessary to utilize a sufficient amount of the polymerized rosin or rosin ester to provide the desired improvements. More rosin may be used with the higher melting polymerized products than with those melting at 100° C. or slightly lower.

The preparation of an improved binder in accordance with the invention for use in linoleum may be carried out by simultaneously heating and oxidizing a mixture of the polymerized rosin and a drying or semi-drying oil until the desired degree of gelation is obtained, as for example in a mechanical oxidizer. Or, if desired, the drying or semi-drying oil may be converted to a gel by oxidation and the polymerized rosin or rosin ester fluxed with the gelled oil by heating. In either process the oils which may be used are, for example, linseed oil, menhaden oil, perilla oil, hempseed oil, soya bean oil, corn oil, etc. In using the first process it will be desirable to employ the polymerized rosin rather than the ester since the acidity of the polymerized rosin serves to delay gelation of the cooking mixture until the oxidation is sufficiently thorough. In such a method the resinous component should have an acid number from about 140 to about 170 to provide desirable combination. In using the process involving heating of the gelled oil with the resinous component the polymerized rosin or the ester thereof are equally preferable. The same is true in the preparation of mastic tile binders. The mastic tile binders are prepared by fusing the polymerized rosin or rosin esters with pitch-like materials as stearin pitch, cottonseed oil pitch, gilsonite, etc., or by fusion with fast-drying oils such as China-wood oil until gelation takes place.

The proportion of polymerized rosin or rosin ester utilized in the improved binders of the invention will generally be comparable to the amount of rosin or other resinous material heretofore used in binders for linoleum or mastic tile. Thus for linoleum binders an amount of polymerized rosin or rosin ester from about 20 to about 30 per cent based on the total binder, and preferably from about 24 to about 26 per cent will be used. For mastic tile binders the amount of polymerized rosin or rosin ester used may be higher, for example from about 25 to about 65 per cent of polymerized rosin or rosin ester, and the remainder the toughening and plasticizing agent.

The polymerized rosin may thus be incorporated in the binder, and the binder employed with the fibrous filler, pigments, etc., normally used in any suitable manner depending on the particular linoleum or mastic tile composition desired. In preparation of a linoleum binder produced by simultaneous heating and oxidation of the polymerized rosin and an oil of drying properties, the oxidation reaction for formation of the binder will desirably be carried out at a temperature within the range of about 170° F. to about 200° F., and preferably from about 175° F. to 185° F. The preferable conditions for the production of a linoleum binder by fusion of the polymerized rosin or rosin ester with a gelled drying or semi-drying oil will involve fusion at a temperature of about 300° F. to about 400° F.

In the production of a binder for use in mastic tile involving fusion of the polymerized rosin or rosin ester with toughening and plasticizing agents such as pitches, blending at a temperature from about 190° F. to about 220° F. will be desirable. When a binder for mastic tile is prepared with a fast drying oil like China-wood oil, fusion at a temperature of about 350° F. to about 400° F. will be desirable. In preparing the latter type of mastic tile binder the proportion of polymerized rosin or rosin ester used is usually from about 15 to about 25% of the total binder.

While the above discussion shows preferable methods of employing polymerized rosin in various specific linoleum and mastic tile compositions, it will be understood that this invention is not limited to any particular compositions or methods of incorporation of the polymerized rosin but contemplates any linoleum or mastic tile binder comprising a polymerized rosin or polymerized rosin ester as a resinous constituent.

In addition to the advantages in alkali resistance and water resistance which the binding agents of this invention exhibit over compositions prepared with ordinary rosin, it is possible to prepare binding agents considerably lighter in color than the corresponding compositions employing ordinary rosin due to the fact that less degradation in color of the binder occurs in the oxidation or in the curing process than in the case of ordinary rosin. Moreover, the improved binding agents are superior in color retention to the compositions containing ordinary rosin. Also, the binding agents prepared according to this invention have higher sheen and gloss. An important advantage is the reduced tendency to deformation by pressure from chair legs, table legs, etc.

The binding agents and floor covering compositions described in accordance with this invention are illustrated by the following specific examples, in which the parts shown are by weight unless otherwise indicated.

*Example I*

A linoleum binder was prepared using the following formula:

| | Parts |
|---|---|
| Polymerized rosin (drop M. P. 100° C., and acid number—156) | 575 |
| Raw menhaden oil | 192 |
| Raw linseed oil | 1533 |
| Litharge | 18.5 |
| Precipitated manganese resinate | .4 |

The materials were mixed and processed by treatment in a mechanical oxidizer for 15 hours at 180° F. with $\frac{1}{10}$ cu. ft. of air per minute at 10% relative humidity. A similar binder was prepared in exactly the same manner, substituting ordinary wood rosin for the polymerized rosin.

Linoleum was prepared with each of the above binders using the following formula:

| | Parts |
|---|---|
| Binder | 100 |
| 50-mesh cork | 50 |
| Wood flour | 35 |
| Whiting | 110 |
| Ocher | 7 |
| Lime | 0.25 |

The materials for each linoleum batch were mixed and sheeted on a two-roll mill, and a portion of each batch calendered on burlap, and cured over a 28-day period at 180° F.

In the alkali spot test, employing 5% NaOH for 20 minutes, the depth of attack on the linoleum prepared with polymerized rosin was 0.005 inch, whereas the depth of attack on the linoleum sample prepared with wood rosin was 0.009 inch. The linoleum prepared with polymerized rosin showed better color and color retention.

*Example II*

A linoleum binder was made using the following formula:

| | Parts |
|---|---|
| Ground scrim oil (linseed oil oxidized in films on cheese cloth) | 1450 |
| Mechanical oil (oil oxidized in a mechanical oxidizer) | 850 |
| Polymerized rosin ester gum of 110° C. drop melting point, and acid number—6 | 850 |
| Whiting | 50 |
| Lime | 4 |

The ground scrim oil and mechanical oil were prepared by a prior oxidation treatment and then processed for one hour at 350° F. with the polymerized rosin ester, the whiting and the lime. The resulting binder was employed to make molded inlaid linoleum of the following composition:

| | Parts |
|---|---|
| Binder | 56 |
| Wood flour | 50 |
| Whiting | 5 |
| Pigment | 55 |

The mixed materials were processed in the usual manner and cured at 180° F. for two weeks, yielding a linoleum of good alkali resistance, good color and good color retention, and high resistance to deformation under load.

*Example III*

A mastic tile was prepared using the following formula:

| | Parts |
|---|---|
| Polymerized rosin | 40 |
| Cottonseed pitch | 24 |
| Asbestos | 29.4 |
| Whiting | 100 |
| Pigment | 10 |

The polymerized rosin and pitch were mixed in a Banbury mixer for two minutes after which the fillers were added and the mixing continued an additional two minutes, the mixer being held at 100° C. The product was then sheeted on a two-roll mill, and the tile stamped out. The product obtained had good alkali and moisture resistance. Its hardness was superior to a similar mastic tile prepared with ordinary rosin.

*Example IV*

A mastic tile binder was prepared by mixing 20 parts of a glycerol ester of a polymerized rosin having an acid number of 6 and a drop melting point of 110° C. with 80 parts of China-wood oil and heating at 350° F. until gelation started. A mastic tile was produced using this binder according to the following formula:

| | Parts |
|---|---|
| Binder | 64 |
| Asbestos | 29.4 |
| Whiting | 100 |
| Pigment | 10 |

The ingredients were mixed in a Banbury mixer as in Example III, sheeted in the usual manner and the tile stamped out. The product resulting had good alkali resistance, hardness and color retention.

It will be understood that the details and examples hereinbefore set forth are illustrative only, and that the invention as broadly described and claimed is in no way limited thereby.

What I claim and desire to protect by Letters Patent is:

1. A binding agent for linoleum comprising an oxidized mixture of a polymerized rosin and an oil of drying properties.

2. A binding agent for linoleum comprising an oxidized mixture of a polymerized rosin and linseed oil.

3. A linoleum composition comprising a filler, a pigment, and as a binder an oxidized mixture of a polymerized rosin and an oil of drying properties.

ABRAHAM B. MILLER.